United States Patent
Clark et al.

[11] Patent Number: 6,043,771
[45] Date of Patent: Mar. 28, 2000

[54] COMPACT, SENSITIVE, LOW POWER DEVICE FOR BROADBAND RADAR DETECTION

[75] Inventors: Casey K. Clark, Burbank; Mark A. Creighton, Torrance, both of Calif.

[73] Assignee: TRW Inc., Redondo Beach, Calif.

[21] Appl. No.: 09/219,002

[22] Filed: Dec. 21, 1998

[51] Int. Cl.$^7$ .................................................. G01S 7/40
[52] U.S. Cl. .............................. 342/13; 342/20; 342/175; 342/195; 375/316
[58] Field of Search .................................. 342/13, 16–20, 342/159–164, 175, 192–197, 89; 375/316

[56] References Cited

U.S. PATENT DOCUMENTS

| | | |
|---|---|---|
| 5,451,956 | 9/1995 | Lochhead . |
| 5,477,227 | 12/1995 | Noneman . |
| 5,550,546 | 8/1996 | Noneman et al. . |
| 5,572,213 | 11/1996 | Noneman et al. . |
| 5,602,876 | 2/1997 | Noneman et al. . |
| 5,870,436 | 2/1999 | Kolanek et al. .................. 375/316 |

*Primary Examiner*—Bernarr E. Gregory
*Attorney, Agent, or Firm*—Michael S. Yatsko

[57] ABSTRACT

A method and system is provided for real-time detection of important multiple pulsed or CW signals of varying amplitude and frequency, from a group of simultaneously intercepted wideband intermediate frequency (IF) channels. The method is implemented in a channelized receiver system with a parameter encoder which filters the IF signals in a time-shared mode by dividing the IF channel bandwidth into progressively decreasing sub-band levels, multiplexing the IF signals from each sub-band and analyzing the time multiplexed IF signals to obtain the IF signal parameters. The system is flexible with programmable parameters and has the ability to eliminate most of the spurious signals with high probability of interception of the real signals. Conventional pulse descriptor words, band limited pre-detection samples and time-frequency pulse images are output for subsequent analysis or tactical application.

26 Claims, 4 Drawing Sheets

COMPACT, SENSITIVE, LOW POWER DEVICE FOR BROADBAND RADAR DETECTION

BACKGROUND OF THE INVENTION

1. Field of the Invention

This invention relates generally to the field of RF channelized receivers, and more specifically pertains to a method for real-time detection of multiple RF pulses of varying amplitude and frequency and a compact, low power parameter encoder and channelized receiver capable of simultaneous, real-time detection of multiple RF pulses over a wide RF bandwidth.

2. Description of the Related Prior Art

Electronic warfare systems are used on modern military ships and aircraft. An electronic warfare search receiver is used to detect opposing force radar emissions. The receiver searches the range of frequencies in which the RF emissions are likely to occur, and detects and analyzes the nature of the signals. By determining the characteristics of the received signals, the user knows the nature and location of the threat.

In a tactical or strategic environment, the density and diversity of the emissions in the RF spectrum is quite large and is expected to increase. With previous detection and monitoring wideband search receivers it is difficult or impossible to successfully monitor such RF emissions. For example, some existing wideband receiver designs employ a simple threshold detector that requires the incoming signal to attain a certain amplitude before it is recognized as a true signal apart from the ordinary RF background noise. These receivers are incapable of differentiating between high amplitude short duration and low amplitude long duration pulses, when they are first detected. With the existing designs, it is entirely possible that the first RF pulse received will effectively prevent detection of the second RF pulse, from another emitter, during the presence of the first pulse. Thus, the first emission source may be identified while the second source is, in effect, masked.

Channelized receivers offer high probability of intercept even in highly dense environments. They provide instantaneous wide bandwidth detection while maintaining high dynamic range, high frequency resolution and direction finding capabilities. This is accomplished by division of the entire wide bandwidth into a number of narrower bandwidths, and parallel processing of each narrow bandwidth in a separate receiver. Therefore, channelized receivers have generally been impractical prior to the mid 1990s because the RF and digital circuitry required for twenty to one hundred detectors is too large and heavy and consumes too much power for tactical platforms.

The radar detection and identification systems should be able to provide information in real time. However, the conventional systems which are able to operate in real time can accurately work only within a limited range of radar pulse parameters, and the sensitivity of the systems decreases rapidly as the parameters depart from the selected range. Further, the systems that must provide high sensitivity have required use of large programmable computers and thus could not be placed upon typical airborne platforms. Moreover, even with the fastest supercomputers, the conventional systems can operate in real time only in a limited bandwidth, usually in the order of 20 MHz.

One existing pulsed signal detection device uses a software-implemented multilevel matched detection filter matrix. Although it has to run on supercomputers, it can only process a very narrow IF bandwidth. This high sensitivity system with "Matched Detection Matrix" (MDM) needs 127 filters plus second pass processing to complete signal characterization on only 20 MHz bandwidth. The system described here is cascaded to provide 1 GHz blocks of real-time pulse parameterization.

Therefore, there is a need for an efficient, small, lightweight, low power channelized receiver with single-pass, real-time characterization processing to meet the needs of future tactical aircraft, helicopters and surveillance platforms and for upgrading the electronic warfare capabilities of existing aircraft. Such a receiver should overcome the limitations of conventional systems in speed and sensitivity as well as bandwidth. The system should also be programmable and should have the ability to eliminate most of the spurious signals while maintaining a high probability of intercepting real signals.

This application is an improvement of the channelized receiver architectures described in U.S. Ser. No. 438,232, filed on May 9, 1995 entitled "Parameter Encoder Architecture", now U.S. Pat. No. 5,572,213, issued Nov. 5, 1996; U.S. Ser. No. 08/109,804, filed on Aug. 20, 1993 entitled "Instantaneous Parameter Measuring Receivere", now U.S. Pat. No. 5,451,956, issued Sep. 19, 1995; and U.S. Ser. No. 08/443,174 filed May 3, 1995 entitled "Advanced Parameter Encoder with Dual Integrated Pulse Present Detection and Channel/Sector Arbitration", now U.S. Pat. No. 5,550,546 issued Aug. 27, 1996, which is a continuation application of Ser. No. 08/154,906, filed Nov. 19, 1993, now abandoned.

SUMMARY OF THE INVENTION

The preceding and other shortcomings of prior art are addressed and overcome by various embodiments of the present invention, which consist of a channelized receiver system with a parameter encoder, and a method for real-time detection of multiple simultaneous, closely spaced signals.

The method embodiment of the present invention filters each individual channel bandwidth into progressively decreasing bandwidth sub-band levels. Typical bandwidths range from tens of MHz down to the order of under 1 MHz. The IF signals are analyzed in real time to obtain the signal parameters.

Another embodiment of the present invention is a parameter encoder which accepts and detects signals from each sub-band filter of progressively narrower bandwidth. The encoder uses a pulse detection module to receive the signals in a time multiplexed mode, and analyze the IF signals to obtain the signal paarameters according to a predetermined sensitivity. A control processor is used to control the parameter encoder in accordance with externally provided command sequences. Channel arbitration circuitry ensures only one report per input pulse. The pulse descriptor word (PDW) assembler is connected to all subchannel detection circuits to produce a pulse descriptor word for each valid pulse signal.

Each detection module has a noise level estimator for providing noise levels, a frequency/phase measurement circuit for providing the IF signal frequency and indication of phase shifts. An amplitude averaging/stable level tracking circuit provides the IF signal amplitude, arrival time, termination time, signal stability, and signal-to-noise ratio. The programmable pulse detector has a multi-level integrated pulse present (IPP) circuit for determining programmable thresholds according to an M out of N voting scheme, with M and N adjustable in each to provide the effect of multiple post-detection low-pass filters.

In the present invention the parameter encoder may have as its input real or complex samples. The implementation for real samples differs only slightly from the complex samples implementation. To measure frequency, the complex sampling embodiment uses a rectangular-to-polar converter and integrates the phase vector. The implementation for real samples measures IF period and averages it over the pulse duration.

Availability of the subchannel filter tree and associated multiple thresholds provides these added features: First in the case that it is desired to transmit Pre-Detection data on selected pulses (such as in the case of a UAV relaying data over a bandwidth-limited link). The amount of link capacity required can be minimized by forwarding only those sub-band segments containing pulses above threshold. Second, the presence of signal energy above threshold in several of the sub-band filters provides a "fingerprint" which complements the Pulse Descriptor Words, as features which will be an aid in pulse sorting, particularly in the case of threat signals having frequency and/or pulse repetition interval agility.

The foregoing and additional features and advantages of the present invention will become further apparent from the following detailed description and accompanying drawing figures that follow. In the figures and written description, numerals indicate the various features of the invention, like numerals referring to like features, throughout for the drawing figures and the written description.

DETAILED DESCRIPTION OF THE INVENTION

The following description is provided to enable any person skilled in the art to make and use the invention and sets forth the best modes contemplated by the inventors for carrying out their invention. Various modifications, however, will remain readily apparent to those skilled in the art, since the general principles of the present invention have been defined herein with specificity.

The overall channelized receiver system using the channelized parameter encoder of the present invention is capable of measuring the signal parameters of RF pulses, including multiple time overlapped pulses, on a nearly instantaneous basis. The receiver uses a small number of detection elements to cover a large instantaneous bandwidth and is coupled with a digital processor that simultaneously processes separate signals according to their parameters, including frequency, pulse modulation, time of arrival, pulse amplitude, pulse width and frequency/time image.

Sections of the channelized receiver system and channelized parameter encoder are digitally controllable so that they can be electronically reconfigured to cover multiple electronically selectable bandwidths. The overall channelized receiver system is capable of measuring the signal parameters of RF pulses. To assist in identifying these pulse parameters, the present invention employs a real time conversion of the input wideband high frequency RF signals to intermediate frequency (IF) signals, suited for the channelized receiver, and detects in real time the time of arrival (TOA), pulse amplitude (PA) and time of end of the pulse. The receiver also has the capability of arbitrating between frequency channels in real time, so that spurious and redundant signals can be eliminated in real time before pulse parameters, such as angle of arrival (AOA), frequency (F), pulse width (PW) and pulse repetition interval (PRI) can be calculated.

Figure 1:
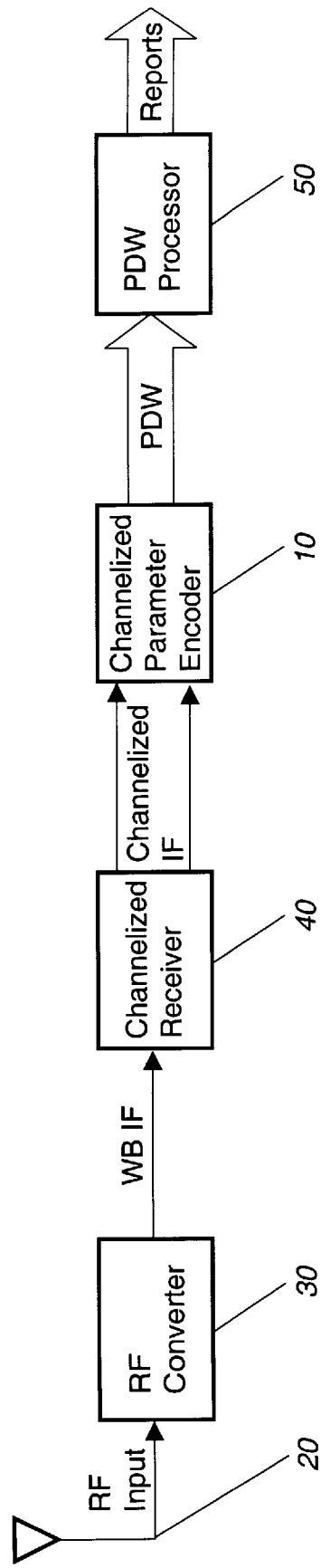
FIG. 1 is a simplified block diagram of an overall channelized receiver system which utilizes a channelized parameter encoder, according to one embodiment of the present invention.

FIG. 1 is an overall block diagram of a channelized receiver system which utilizes the channelized parameter encoder (10) of the present invention. It allows detection of enemy radar systems by tactical and strategic electronic warfare receivers. The receiver system searches the range of RF frequencies in which the RF emissions are likely to occur, and detects and analyzes the nature of the RF signals. The RF input signals are input from a system antenna 20 and converted in an RF converter 30 into wideband intermediate frequency (IF) signals suited for a channelized receiver 40. A channelized parameter encoder (PE) 10 of the present invention is a key element in this broadband radar detection and identification system.

The channelized receiver 40 has an IF filter bank, not shown, that divides the wideband IF signals of the system into a number of separate channels of IF signals suitable for the channelized parameter encoder 10. In the parameter encoder 10 the individual channelized IF signals are digitized, samples are analyzed and information is presented in a Pulse Descriptor Word (PDW) format, suited for further computer processing in a PDW processor 50. The PDW processor 50 uses the information from the pulse descriptor words to generate tactical and analytical reports.

The parameter encoder 10 performs efficiently in real time and allows input of a very wide aggregate processing bandwidth of, for example 1 GHz. The module is able to adapt to extremely high input pulse rates, to selectively output only the critical information, make precise measurements on a monopulse basis, cope with and characterize various modulations, and has very low energy and space requirements. The parameter encoder 10 of the present invention is preferably an ASIC. It is shown in detail in FIG. 2 and performs sub-channel filtering, detection of important input signals, and measurement of their parameters. This is accomplished with a cascade 90 of digital bandpass filters 100, followed by a pulse detection module 200.

There is a separate cascade 90 of digital bandpass sub-filters filters 100 for each (1 to 100 or more) individual IF channel, where each IF channel is a section of the wideband input RF signal. The cascade 90 of digital bandpass filters 100 is capable of accepting pre-detection channelized IF inputs (Pre-D) 110 from one or more IF channels of the channelized receiver 40, and enhances sensitivity of the wideband radar detection system for a wide range of pulse-widths and time-frequency characteristics. The IF inputs 110 may be real or complex samples, with nominal bandwidth of 20 MHz to 100 MHz, depending upon the type of input signals of interest and available ASIC technology. The sampling fidelity preferably ranges from 8 to 12 bits (for each real, I component and Q component), but may be fewer than 8 or higher than 12 bits, depending upon the available technology and application need. The sampling rate is selected according to the IF bandwidth and real or complex sampling.

Figure 2:
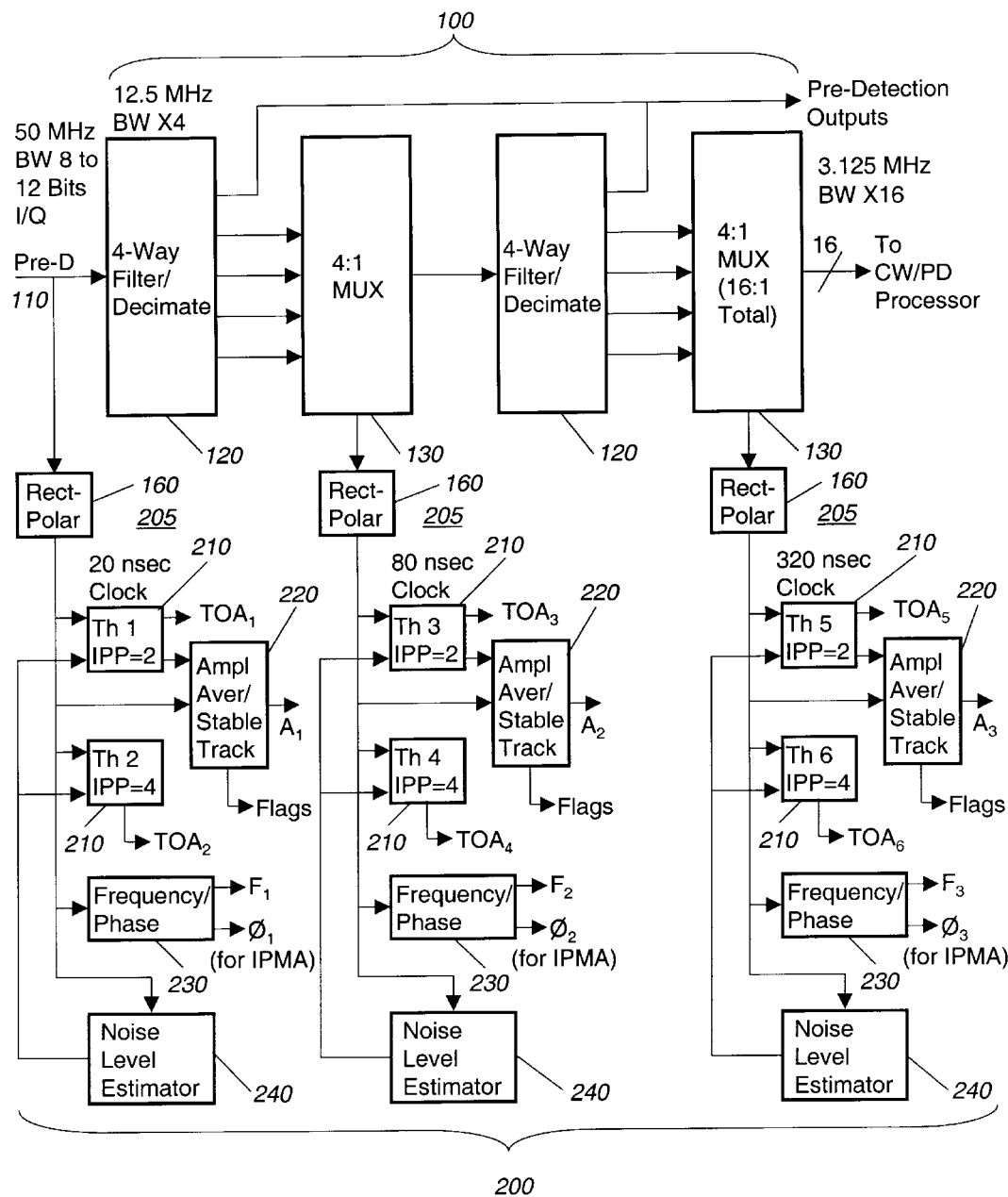
FIG. 2 is a detailed block diagram illustrating the implementation of the parameter encoder for complex samples and showing a cascade of digital bandpass filters and a pulse detection module, according to one embodiment of the present invention.
Figures 3, 4:
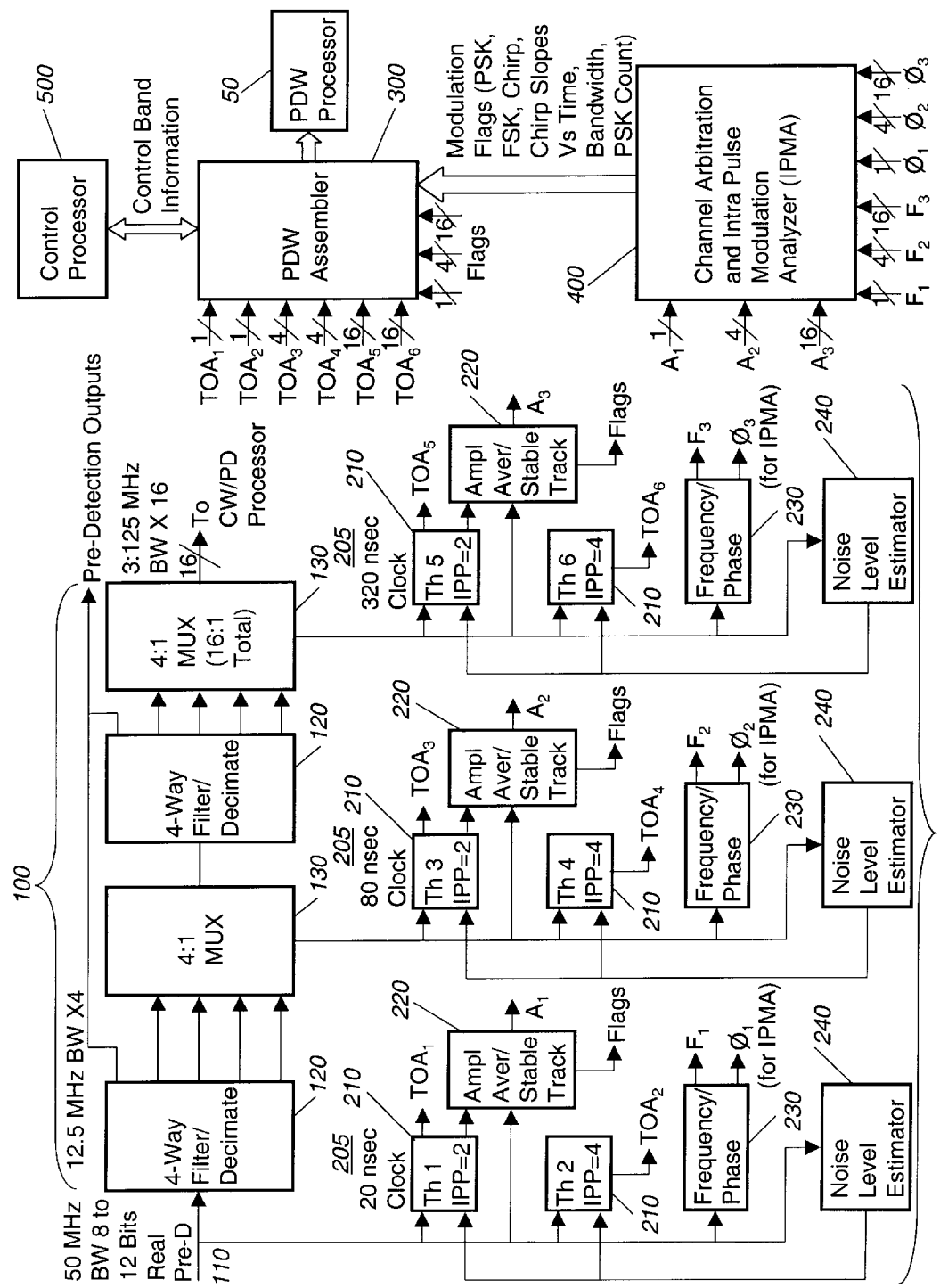
FIG. 3 is a detailed block diagram illustrating the implementation of the parameter encoder for real samples and showing a cascade of digital bandpass filters and a pulse detection module, according to one embodiment of the present invention.
FIG. 4 is a detailed block diagram illustrating a PDW assembler, a channel arbitration and intra pulse modulation analyzer (IPMA) module, and a control processor of the parameter encoder of the present invention.

The computers used in the system are shown in FIG. 4 and include a PDW assembler 300, a channel arbitration and intra pulse modulation analyzer (IPMA) module 400, and a control processor 500. The outputs of each level of the cascade 90 of digital bandpass filters 100 (FIG. 2) are connected to the pulse descriptor word assembler 300, which is ultimately responsible for producing a pulse descriptor word for each important signal that has been received across the frequency spectrum covered by the antenna 20 (FIG. 1). The output of each filter level 100 (FIG. 2) is also connected to the CW/Pulse Doppler (PD) processor, not shown. The channel arbitrator and IPMA module 400 (FIG. 4) controls the selection of the important channels by using the integrated pulse amplitude and frequency data as the basis for arbitration. The system is controlled by the control processor 500, which interprets external commands, such as band and threshold settings, and maintains a record of current configuration, channel noise levels and system status.

As illustrated in FIG. 2, the cascade 90 of digital bandpass filters 100 consists of a first 102 and second 104 level of, preferably 4-way, filter/decimate elements 120, each followed by a 4:1 multiplexer 130. Each level 4-way filter/decimate element 120, is used to divide the bandwidth of the pre-detection channel of IF inputs (Pre-D) 110, of, for example, 50 MHz, into narrower bandwidths. The first level 4-way filter/decimate element 120 divides the initial IF channel bandwidth into four adjacent sub-bands (sub-channels) of equal frequency bandwidth, in this example of 12.5 MHz, to analyze IF signals of various frequencies across the spectrum selected by the channelized receiver 40 (FIG. 1). The second level of 4-way filter/decimate elements divides each 12.5 MHz bandwidth into four adjacent sub-bands of equal frequency bandwidth, in this example of 3.125 MHz, to obtain even higher sensitivity.

The cascade 90 of digital bandpass filters 100 may have two, three, four or more levels of the 4-way filter/decimate elements 120, and the same number of the multiplexers 130, depending upon the required IF signal pulse width range and desired sensitivity. This means that there are 20 filters in a two-level system (four first level 4-way filter/decimate elements 120 and sixteen second level 4-way filter/decimate elements) and 84 filters in the three-level system (four first level 4-way filter/decimate elements 120, sixteen second level 4-way filter/decimate elements 122 and sixty-four more third level 4-way filter/decimate elements, not shown). The system with four levels has further filter output rate decimation appropriate for the reduced bandwidths, and the next filter level 100, not shown, performs yet progressively narrower sub-band filtering for detecting signal characteristics. This process of filter and detect is repeated for each of the levels of sub-bands with progressively narrower bandwidths until the desired final bandwidth and sensitivity are reached, which preferably takes three or four levels of filtering and detection. Pre-detection signals from only the sub-channels containing signal information may be extracted as shown.

FIG. 2 shows a functional block diagram of the pulse detection module 200, capable of processing simultaneously received signals, which performs detection of important input signals and measurement of their parameters. It consists of several detection modules 205. Multiple control and data lines connect the detection modules 205 to the control processor 500 (FIG. 4) and to the channel arbitration and IPMA module 400 for further processing. The input of each detection module 205 is connected to the output of one filter level 100. Each analog detection module 205 has the following elements: a noise level estimator (NLE) 240, a frequency/phase measurement circuit 230, and an amplitude averaging/stable level tracking circuit 220 with two or three threshold circuits 210 with a threshold level chosen from $T_h 1$ to $T_h n$.

The number of sub-band filtering levels and bandwidths are selected to optimize the balance between the circuit complexity and detection performance. Further, the output of the multiplexer 130 for each level of 4-way filter/decimate elements 120, may be time multiplexed in accordance with the bandwidth filtering ratio to minimize gate count. The first analog detection module 205 receives the IF signal with the full bandwidth of, for example 50 MHz. The use of multiplexing may reduce gate count because instead of fully populating the pulse detection module 200 with the number of analog detection modules 205 equal to the number of sub-bands, it allows only three identical analog detection modules 205 to serve the function of twenty conventional detection circuits which do not use multiplexed signals. In general, the system needs the number of analog detection modules 205 equal to the number of filter levels in the filter cascade 100 plus one or may be fully executed in non-shared gates.

The twenty individual pre-detection channels of IF inputs 110, of, for example, 50 MHz, maintain a near 100% probability of signal intercept, detection and tracking over the full wideband input of 1 GHz. The selection of the important channels is controlled by the channel arbitrator of module 400 (FIG. 4), according to the parameters set by the control processor 500, such as time of arrival (TOA) frequency and pulse amplitude (PA), to determine which channel has an important IF pulse and which detections are only receiving energy "spill-over" from adjacent channels.

The IF signals are provided into each frequency/phase measurement circuit 230, threshold circuit 210, amplitude averaging/stable level tracking circuit 220, and noise level estimator 240 either from the multiplexers 130 or are the pre-detection channelized IF inputs 110. The outputs of each frequency/phase measurement circuit 230 are signal frequency and phase, which are supplied to the channel arbitration and IPMA module 400. Each noise level estimator 240 is also connected to the control processor 500 (FIG. 4). It provides a basis for threshold offsets used in the threshold circuits 210 and constant false alarm rate (CFAR) thresholding or signal-to-noise ratio. This module reloads each threshold circuit 210 at the beginning of each dwell with the last stored noise value, to avoid waiting for a stabilization period.

The present invention includes an apparatus that can measure multiple time overlapped pulses on a nearly instantaneous basis. To detect pulse parameters a given threshold above noise must be exceeded. When a pulse arrives, the values of the amplitude samples are measured and when sufficient samples above threshold are detected, a pulse presence is declared. Following detection of a pulse, amplitude samples are continuously taken and processed to detect the end of the pulse or a pulse-on-pulse condition.

A pulse-on-pulse condition is detected when the difference between successive amplitude samples again starts to increase after initially stabilizing. As soon as some amplitude samples fall within a predetermined voltage window then the second pulse is declared to be stabilized. On the trailing edge of the second pulse, the successive differences between amplitude samples become comparatively large and fall outside of the predetermined amplitude window indicating termination of the second pulse. By using this method, the parameter encoder can determine when the leading edge of a pulse occurs, when the pulse is stable, when an additional pulse is encountered and when the pulses terminate. In the subject configuration, pulse-on-pulse is minimized by the multiple subchannel filters.

Each detection module 205 of the present invention has its specific clock of, for example, 20 nsec, 80 nsec and 320 nsec, respectively, where the clock rate of each module 205 is reduced by 4, as in the cascade of digital filters 100. Each threshold circuit 210 has a threshold level marked consecutively from $T_h1$ to $T_hn$ and is used to determine the time of arrival, corresponding to the leading edge of a received RF signal, or the time when a pulse is first detected.

The threshold circuit 210 performs integral filtering to qualify important signals, using the multi-level integrated pulse present (IPP) system in the form of M out of N sampled data qualification. In the M out of N sampled data qualification, when M out of N, for example, two out of the last three, successive amplitude samples fall above the threshold the PDW generator process is started. The IPP flag is set according to the result of the M out of N voting scheme used to declare a valid pulse present. The approach requires M consecutive samples above the pulse present threshold to gain the IPP status, and J consecutive samples below the pulse present threshold to lose the IPP status. M and J may have any programmable value between, for example, 1 and 32.

In the present invention a multi-level integrated pulse present (IPP) system uses several digitally programmable thresholds and M of N values for determining pulse presence. A high data rate excision algorithm, activated after a programmable number of pulses at high rate have passed allows the PDW processor to bypass redundant pulses from high rate signals. Because the data excision algorithm excises one subchannel at a time, the system of the present invention minimizes the amount of channel blockage which would occur if the algorithm was performed on the whole channel.

The amplitude averaging/stable level tracking circuit 220 also provides Time of Arrival (TOA) and the corresponding Time of End of Pulse to compute pulse width of the selected important signal.

The application of the IPP in the threshold circuit 210 gives the system immunity from "Rabbit Ears" (Gibb's Phenomenon), in addition to the immunity from impulse noise. The system does not attempt to detect signals in the "matched filter" mode of the prior art because passing a noise impulse through a matched filter creates an output which is exactly the matched filter response, and thus does not allow discrimination against either noise impulses or Gibb's Phenomenon.

Figure 5:
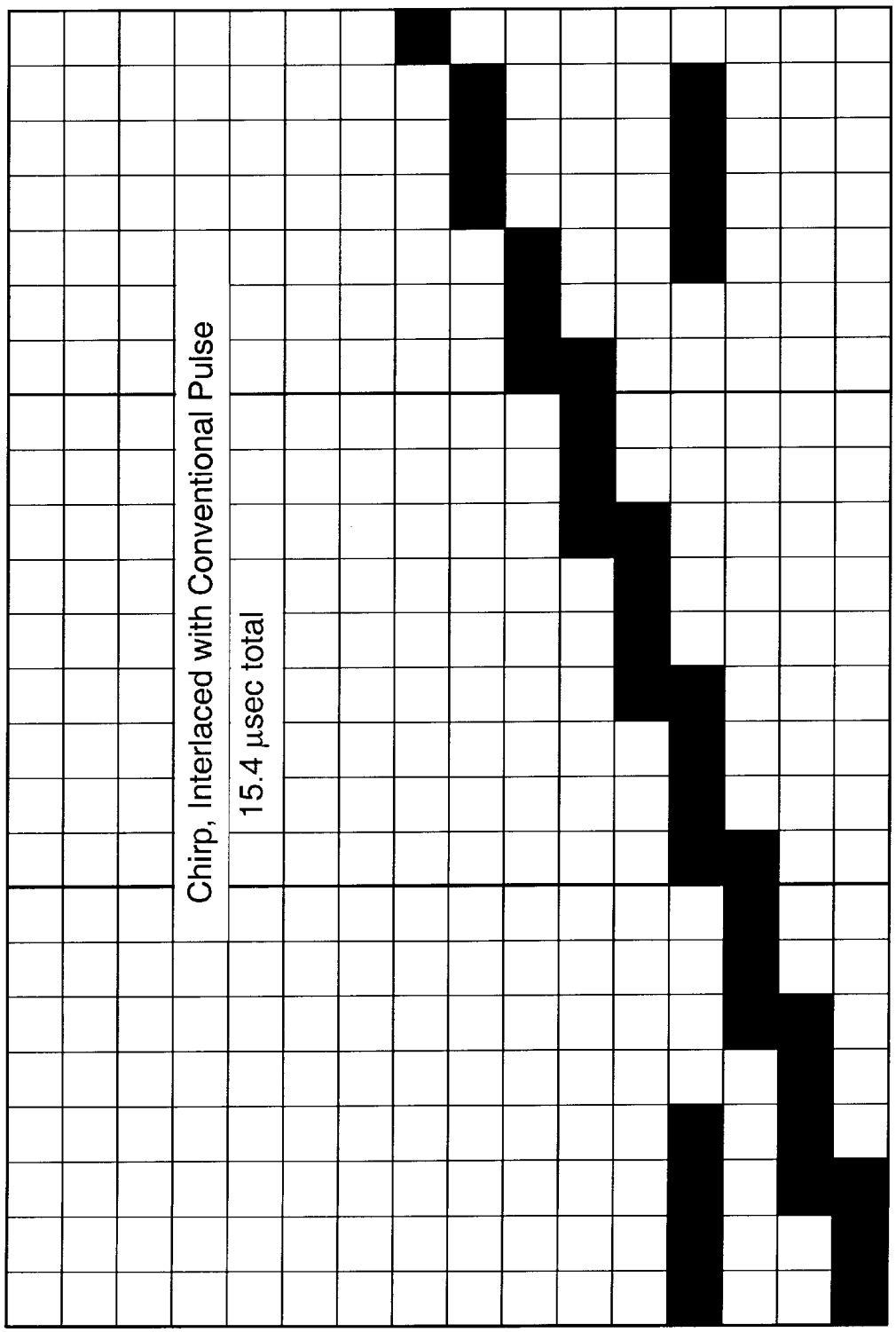
FIG. 5 is an illustration of pulse "fingerprints" typical of conventional (horizontal bars) and chirp (diagonal bars) as output from the frequency-time pulse image generation logic.

In the present invention the implementation of the channelized parameter encoder 10 for real samples, shown in FIG. 3, differs only slightly from the complex samples implementation, as shown in FIG. 2. To obtain frequency, the complex sampling embodiment (FIG. 2) uses a rectangular-to-polar converter 160 and integrates the phase vector. The implementation for real samples measures IF period and converts that to frequency. In either implementation, the outputs of the individual thresholds 210 may be presented as Pulse Images (FIG. 5), to enhance the characterization available in the standard PDW.

Referring to FIG. 4, the amplitudes, frequencies and phases are passed from the pulse detection module 200 to the channel arbitration and intra pulse modulation analyzer (IPMA) 400. This module examines the outputs of various filters vs. time, and determines the filter which is likely to contain the most accurate representation of the signal and channel designation. The module 400 also uses the outputs of various pulse detection modules 200 to determine the presence of carrier modulation within the pulse, characterized by bandwidth, chip count, chirp and chirp frequency slope, phase shift keying (PSK), and frequency shift keying (FSK).

The PDW assembler 300 logic combines digital information on signal modulation, times of arrival, and flags from each of the analog detection modules 205 and the channel arbitration and intra pulse modulation analyzer (IPMA) 400 to select the most accurate representation of the pulse arrival time and pulse width, depending upon the results of channel arbitration in the module 400, and to create pulse descriptor words. The PDWs are then output to the PDW processor 50, where they are grouped into sets of information for further analysis or tactical applications. Pulse descriptor words can be of varying length but typically are between 96 and 256 bits long. Each pulse descriptor word contains the information about the interesting RF signals that have been received, such as frequency, phase, time and angle of arrival, pulse amplitude, pulse width and specified external data. Under certain circumstances, one or several particular types of waveforms may be of interest to the user and under these circumstances it may be advantageous to identify these signals quickly, for further action. The system has the ability to identify and eliminate or mark of interest parameters of a pulse descriptor word and at the same time is able to change the system requirements and parameters.

For remotely operated systems, pre-detection information can be extracted from the selected filter output and transmitted to a central analysis facility, not shown, thereby allowing more detailed evaluation of selected signal data, if desired, with minimum impact on link real-time capacity. The use of the cascade 90 of digital bandpass filters 100 or a digital sub-band tuner (not shown) minimizes impact of the link bandwidth bottleneck on transmission of pre-detection information to the central analysis facility. The central analysis facility assembles the pulse descriptor words and pulse image data into sets representing individual signals and files reports or provides the data for tactical response. Storage and filtering of the IF subbands containing the important signals (already detected) to allow transmisison with minimum bandwidth requirement. The pre-detection IF segments to a control analysis facility (in addition to the PDWs).

The preferred embodiment of the present invention only uses between 20 and 84 filters in the cascade 90 of digital bandpass filters 100 with two or three levels, depending upon the range of pulse widths covered, with sensitivity degradation from ideal matched filters limited to nominally 2 dB. This sensitivity is up to 10dB better than the best hardware systems currently available and is obtained while operating in real time, which is not possible with current software systems. The system provides optimized selection of the sparse matrix of IF subband and low pass M of N filters to achieve realtime operation over multi-GHz bandwidth with minimum size, weight and power and less than 2 dB sensitivity penalty over the prior, software, art. When implemented in modern ASIC technology, the system is lightweight, of compact size, and can be packaged in less than 2000 cubic inch for each GHz of bandwidth covered, which is a factor of 4000 reduction from the current software technology. The system provides highly sensitive performance with low power requirement and is well suited for airborne applications and the needs of future tactical aircraft, helicopters and unmanned surveillance platforms. The combination of hardware and software approaches allows arbitration for all channels in real time, which greatly reduces the number of pulse descriptor words sent to the PDW processor 50, giving the receiver both a high probability of intercept and a low false alarm rate. The system is flexible because the parameters are programmable, and thus has the ability to eliminate most of the spurious signals while maintaining a high probability of intercepting real signals.

While this invention has been described with reference to its presently preferred embodiments, its scope is only limited insofar as defined by the following set of claims and all equivalents thereof. It is quite clear that the above description has been given purely by way of a non-restrictive example. The digital values have been given purely to illustrate the description. Those skilled in the art will appreciate that various adaptations and modifications of the described preferred embodiments can be configured without departing from the scope and spirit of the invention. Therefore, it is to be understood that, within the scope of the appended claims, the invention may be practiced otherwise than as specifically described herein.

What is claimed is:

1. A parameter encoder for receiving at least one wideband intermediate frequency (IF) channel of IF signals from a simultaneously intercepted plurality of IF channels each having a predetermined channel bandwidth, and for real-time detection of important IF signals of varying amplitude and frequency from said IF channel, comprising:
    a cascade of bandpass filters having filters grouped in a plurality of filter levels, each said filter level filtering said IF signals by dividing each IF channel bandwidth into a plurality of sub-band levels, each said sub-band level having a progressively narrower bandwidth than preceding sub-band levels;
    a pulse detection means for receiving said IF signals in a sub-band time multiplexed mode and for analyzing said IF signals to obtain IF signal parameters;
    a control processor means for determining the important IF signals according to the IF signal parameters;
    a channel arbitration means for selecting the IF channel corresponding to the important IF signal; and
    a pulse descriptor word (PDW) assembler means connected to said control processor means and said channel arbitration means for producing a pulse descriptor word for each said important IF signal.

2. The encoder of claim 1 wherein:
said cascade of bandpass filters comprises
    a first level filter/decimate means for filtering the IF signals in time-shared mode by dividing the IF channel bandwidth into a plurality of first level sub-bands of equal bandwidth and adjacent frequencies, according to a first level sub-band bandwidth filtering ratio,
    a first level multiplexer for sub-band time multiplexing the IF signals from the first level filter/decimate means,
    a second level filter/decimate means for filtering the IF signals in time-shared mode by dividing each said first level sub-band into a plurality of second level sub-bands of equal bandwidth and adjacent frequencies, according to a second level sub-band bandwidth filtering ratio, and
    a second level multiplexer for sub-band time multiplexing the IF signals from the second level filter/decimate means, wherein
the first level multiplexer has a time multiplexed output in accordance with the first level sub-band bandwidth filtering ratio and the second level multiplexer has a time multiplexed output in accordance with the second level sub-band bandwidth filtering ratio, and
the first and second level multiplexers sum the time-shared IF signals from each said first and second level filter/decimate means, respectively, to obtain speed necessary for real time processing.

3. The encoder of claim 2 wherein the pulse detection means comprises
    a first detection means for detecting the IF signals within the IF channel bandwidth, and
    a second detection means for each of said sub-band levels, one of said second detection means receiving the sub-band time multiplexed IF signals from the first level multiplexer, and another of said second detection means receiving the sub-band time multiplexed IF signals from the second level multiplexer.

4. The encoder of claim 3 wherein each of said first and second detection means includes:
    a noise level estimator means for providing noise levels,
    a frequency/phase measurement means for providing frequency and phase information for the IF signal, and
    an amplitude averaging/stable level tracking means having a multiple threshold limit means for providing IF signal amplitude, arrival time, termination time, signal stability, and signal-to-noise ratio information to the channel arbitration means.

5. The encoder of claim 4 wherein the multiple threshold limit means includes programmable pulse detection means for detecting both short duration pulses and long duration pulses.

6. The encoder of claim 5 wherein the programmable pulse detection means includes a multi-level integrated pulse present means for determining two programmable thresholds (IPP) according to an M out of N voting scheme, to determine pulse presence, and for performing IF signal qualification and stability assessment one sub-band at the time.

7. The encoder of claim 6 wherein each said IF channel processed in the cascade of bandpass filters has a frequency bandwidth from 20 to 100 MHz.

8. The encoder of claim 7 further comprising means for determining presence and characteristics of carrier modulation within the important IF signal.

9. The encoder of claim 8 wherein the first and second level filter/decimate means comprises 4-way filter/decimate filters; and
    said cascade of bandpass filters comprises digital filters.

10. The encoder of claim 8 wherein the IF signals are represented as complex numbers; and
    further comprising a rectangular-to-polar converter and a phase vector integrator.

11. The encoder of claim 4 wherein said frequency/phase measurement means further comprises an intra-pulse modulation analyzer.

12. The encoder of claim 5 wherein said programmable pulse detection means comprises an output including a frequency and time pattern, and wherein said pulse detection means comprises a pulse image generation device.

13. The encoder of claim 1 further comprising means for transmitting said pulse descriptor word to a remote processing facility.

14. The encoder of claim 1 further comprising:
means for digitally storing said important IF signals;
means for filtering said digitally stored important IF signals to a predetermined bandwidth in accordance with the energy detection of important signal information; and
means for transmitting said filtered important IF signals to a remote processing facility.

15. A channelized parameter measurement receiver system for real-time detection of important IF signals from a simultaneously intercepted plurality of wideband high frequency RF signals of varying amplitude and frequency, comprising:
an RF converter for converting the high frequency RF signals into wideband intermediate frequency (IF) signals;
a channelized receiver for dividing the wideband IF signals into a plurality of IF channels; and
a parameter encoder for receiving at least one IF channel of IF signals and detecting the IF signal characteristics in time-shared mode, comprising:
a cascade of bandpass filters having filters grouped in a plurality of filter levels, each said filter level filtering said IF signals by dividing the IF channel bandwidth into a sub-band level, each said sub-band level having a progressively narrower bandwidth than preceding sub-band levels,
a pulse detection means for receiving said IF signals in sub-band time multiplexed mode, and for analyzing said IF signals to obtain the IF signal parameters according to a predetermined sensitivity,
a control processor means for controlling the parameter encoder according to commands from an external source; and
a pulse descriptor word (PDW) assembler means connected to said control processor means for producing a pulse descriptor word for each said important IF signal.

16. The system of claim 15 wherein said cascade of bandpass filters comprises:
a first level filter/decimate means for filtering the IF signals in time-shared mode by dividing the IF channel bandwidth into a plurality of first level sub-bands of equal bandwidth and adjacent frequencies, according to a first level sub-band bandwidth filtering ratio,
a first level multiplexer for sub-band time multiplexing the IF signals from the first level filter/decimate means,
a second level filter/decimate means for filtering the IF signals in time-shared mode by dividing each said first level sub-band into a plurality of second level sub-bands of equal bandwidth and adjacent frequencies, according to a second level sub-band bandwidth filtering ratio, and
a second level multiplexer for sub-band time multiplexing the IF signals from the second level filter/decimate means; and wherein the first level multiplexer has a time multiplexed output in accordance with the first level sub-band bandwidth filtering ratio and the second level multiplexer has a time multiplexed output in accordance with the second level sub-band bandwidth filtering ratio, and the first and second level multiplexers sum the time-shared IF signals from each said first and second level filter/decimate means, respectively.

17. The system of claim 16 wherein the pulse detection means comprises:
a first detection means for the IF signals within the IF channel bandwidth; and
a second detection means for each said sub-band level; and wherein
one of said second detection means receives the sub-band time multiplexed IF signals from the first level multiplexer, and another of said second detection means receives the sub-band time multiplexed IF signals from the second level multiplexer.

18. The system of claim 17 wherein each of said first and second detection means includes:
a noise level estimator means for providing noise levels;
a frequency/phase measurement means for providing frequency and phase information concerning the IF signal; and
an amplitude averaging/stable level tracking means having a multiple threshold means for providing IF signal amplitude, arrival time, termination time, signal stability, and signal-to-noise ratio information to the channel arbitration means.

19. The system of claim 18 wherein the multiple threshold limit means includes programmable pulse detection means, to produce separate pulse presence signals for each said sub-band, for detecting both short duration pulses and long duration pulses.

20. The system of claim 19 wherein the programmable pulse detection means includes a multi-level integrated pulse present means for determining programmable thresholds according to an M out of N voting scheme, to determine pulse presence, and for performing IF signal qualification and stability assessment one sub-band at the time.

21. The system of claim 20 wherein each of said IF channels processed in the cascade of bandpass filters has a frequency bandwidth of from 40 to 100 MHz and the wideband IF signals have a frequency bandwidth of from 0.5 to 4.0 GHz.

22. The system of claim 21 further comprising means for determining presence and characteristics of carrier modulation within the important IF signal.

23. The system of claim 22 wherein:
the first and second level filter/decimate means comprises 4-way filter/decimate filters;
said cascade of bandpass filters comprises digital filters; and
said first and second detection means comprises analog detection means.

24. The system of claim 22 wherein the IF signals are represented as complex numbers, and the parameter encoder further comprises a rectangular-to-polar converter and a phase vector integrator.

25. The system of claim 22 wherein the control processor controls the system by interpreting external commands, selecting sub-band and threshold settings, maintaining system status, and determining noise levels of the IF channels, and the parameter encoder further comprises a PDW processor means using the pulse descriptor words to generate tactical and analytical reports.

26. A method for receiving at least one wideband intermediate frequency (IF) of IF signals from a simultaneously intercepted plurality of narrower IF channels, and for real-time detection of important IF signals of varying amplitude and frequency from said IF channel, comprising the steps of:

(a) analyzing said IF signals to obtain IF signal parameters according to a predetermined sensitivity;

(b) filtering said IF signals in a time-shared mode by dividing the IF channel bandwidth into a sub-band level;

(c) multiplexing said IF signals from each said sub-band level;

(d) receiving said time multiplexed IF signals from each said sub-band and analyzing said IF signals to obtain the IF signal parameters according to a predetermined sensitivity;

(e) repeating the steps of filtering, multiplexing and analyzing said IF signals by progressively decreasing the sub-band level bandwidth until reaching the predetermined final bandwidth and sensitivity;

(f) determining the important IF signals according to the IF signal parameters; and (g) producing a pulse descriptor word for each said important IF signal.

* * * * *